(12) United States Patent
Armstrong et al.

(10) Patent No.: US 7,243,133 B2
(45) Date of Patent: Jul. 10, 2007

(54) METHOD AND APPARATUS FOR REDUCING LATENCY IN AN INTERACTIVE INFORMATION DISTRIBUTION SYSTEM

(75) Inventors: James B. Armstrong, Leonia, NJ (US); Muyu Guo, Princeton, NJ (US)

(73) Assignee: Sedna Patent Services, LLC, Philadelphia, PA (US)

(*) Notice: Subject to any disclaimer, the term of this patent is extended or adjusted under 35 U.S.C. 154(b) by 50 days.

(21) Appl. No.: 10/414,711

(22) Filed: Apr. 16, 2003

(65) Prior Publication Data

US 2003/0229684 A1 Dec. 11, 2003

Related U.S. Application Data

(63) Continuation of application No. 09/435,800, filed on Nov. 8, 1999, now abandoned.

(60) Provisional application No. 60/126,835, filed on Mar. 30, 1999.

(51) Int. Cl.
*G06F 15/167* (2006.01)

(52) U.S. Cl. ............... 709/213; 709/202; 709/203; 709/217; 707/3; 707/104.1

(58) Field of Classification Search ............ 709/201, 709/212, 217, 227, 231, 203, 216, 245, 202, 709/205, 213, 219; 707/3, 104.1; 715/700
See application file for complete search history.

(56) References Cited

U.S. PATENT DOCUMENTS

| | | | | |
|---|---|---|---|---|
| 5,241,671 A | * | 8/1993 | Reed et al. | 707/104.1 |
| 5,442,747 A | * | 8/1995 | Chan et al. | 345/543 |
| 5,671,377 A | | 9/1997 | Bleidt et al. | 345/328 |
| 5,721,878 A | * | 2/1998 | Ottesen et al. | 725/87 |
| 5,727,211 A | | 3/1998 | Gulsen | 395/678 |
| 5,742,840 A | | 4/1998 | Hansen et al. | 395/800 |
| 5,774,660 A | * | 6/1998 | Brendel et al. | 709/201 |
| 5,799,267 A | | 8/1998 | Siegal | 704/1 |
| 5,802,283 A | * | 9/1998 | Grady et al. | 709/227 |
| 5,852,820 A | | 12/1998 | Burrows | 707/2 |
| 5,862,396 A | | 1/1999 | Motomura | 395/800 |
| 5,903,892 A | * | 5/1999 | Hoffert et al. | 707/10 |
| 5,913,026 A | | 6/1999 | Bleidt et al. | 395/200.31 |
| 5,982,370 A | * | 11/1999 | Kamper | 715/760 |
| 6,005,565 A | | 12/1999 | Legall et al. | 345/327 |
| 6,025,837 A | * | 2/2000 | Matthews et al. | 715/721 |
| 6,026,478 A | | 2/2000 | Dowling | 712/24 |
| 6,041,362 A | * | 3/2000 | Mears et al. | 719/310 |
| 6,154,210 A | * | 11/2000 | Anderson | 715/840 |
| 6,182,065 B1 | * | 1/2001 | Yeomans | 707/3 |
| 6,208,335 B1 | * | 3/2001 | Gordon et al. | 715/721 |
| 6,209,024 B1 | | 3/2001 | Armstrong et al. | 709/212 |
| 6,392,664 B1 | * | 5/2002 | White et al. | 715/717 |
| 6,452,923 B1 | * | 9/2002 | Gerszberg et al. | 370/352 |
| 6,510,557 B1 | * | 1/2003 | Thrift | 725/110 |
| 6,628,302 B2 | * | 9/2003 | White et al. | 715/717 |
| 6,694,352 B1 | * | 2/2004 | Omoigui | 709/205 |
| 6,839,705 B1 | * | 1/2005 | Grooters | 707/4 |
| 6,847,977 B2 | * | 1/2005 | Abajian | 707/102 |
| 6,968,364 B1 | * | 11/2005 | Wong et al. | 709/217 |
| 7,082,437 B2 | * | 7/2006 | Reed et al. | 707/102 |

* cited by examiner

*Primary Examiner*—Michael Won
(74) *Attorney, Agent, or Firm*—Patterson & Sheridan, LLP

(57) ABSTRACT

A method and apparatus for storing, retrieving and distributing multimedia information having frequently accessed multimedia information stored in solid state memory and less frequently accessed multimedia information stored in a mass storage device.

14 Claims, 5 Drawing Sheets

METHOD AND APPARATUS FOR REDUCING LATENCY IN AN INTERACTIVE INFORMATION DISTRIBUTION SYSTEM

This application is a continuation of commonly owned U.S. patent application Ser. No. 09/435,800, filed on Nov. 8, 1999, now abandoned which application claims benefit of U.S. Provisional patent application Ser. No. 60/126,835, filed Mar. 30, 1999, and both of which prior applications are hereby incorporated herein by reference in their entireties.

BACKGROUND OF THE DISCLOSURE

1. Field of the Invention

The invention relates to a system for storing and accessing electronic data. More particularly, the invention relates to a data storage, retrieval and distribution system for reducing the latency for multiple system users that independently access previously stored streams of electronic data.

2. Description of the Background Art

A typical interactive information distribution system comprises an information server, a data communications network and a user terminal. The server generally comprises one or more computers and an information storage device such as a disk drive or an array of disk drives. The disk-based storage stores both data and data searching tools. As such, a user terminal executes the data searching tool to identify data stored in the server and then requests that data for transmission to the user terminal for display. Since both the data and the data search tools are stored in the server's disk-based storage, a significant latency is experienced by the user when accessing both the tools and the data.

Therefore, a need exists in the art for a method and apparatus that reduces the latency in an interactive information distribution system.

SUMMARY OF THE INVENTION

The disadvantages associated with the prior art are overcome by an interactive information distribution system that reduces data delivery latency by storing data search tools and frequently used data in dynamic random access memory (DRAM) and less frequently used data in disk-based storage within a server.

More specifically, the interactive information distribution system comprises an information server, a data communications network, and a plurality of user terminals. Such a system is useful in providing a video-on-demand (VOD) service. The user terminal communicates with the server through the network to request information such as movies. The information is then sent from the server to the user terminal for display upon the user's equipment, e.g., television. To aid in selecting information, the system provides information search tools, one of which is known as a Navigator. Other aids to selecting information include programming guides and the like. The information server comprises one or more processors coupled to both semiconductor memory such as DRAM and disk-based storage. The data, such as most video files, are stored in the disk-based storage, while the search tools (Navigator and/or programming guides) and some frequently used video files are stored in DRAM. As such, when a user requires the search tools or frequently used data to be displayed, the tools and data are rapidly retrieved from DRAM and transmitted to the user terminal. As such, the user experiences substantially less latency in using the search tools and/or the frequently used data. Additionally, the invention reduces the number of users that contend for disk based storage access at any instant in time. Thus, allowing more users to use the system to access the disk-based storage.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
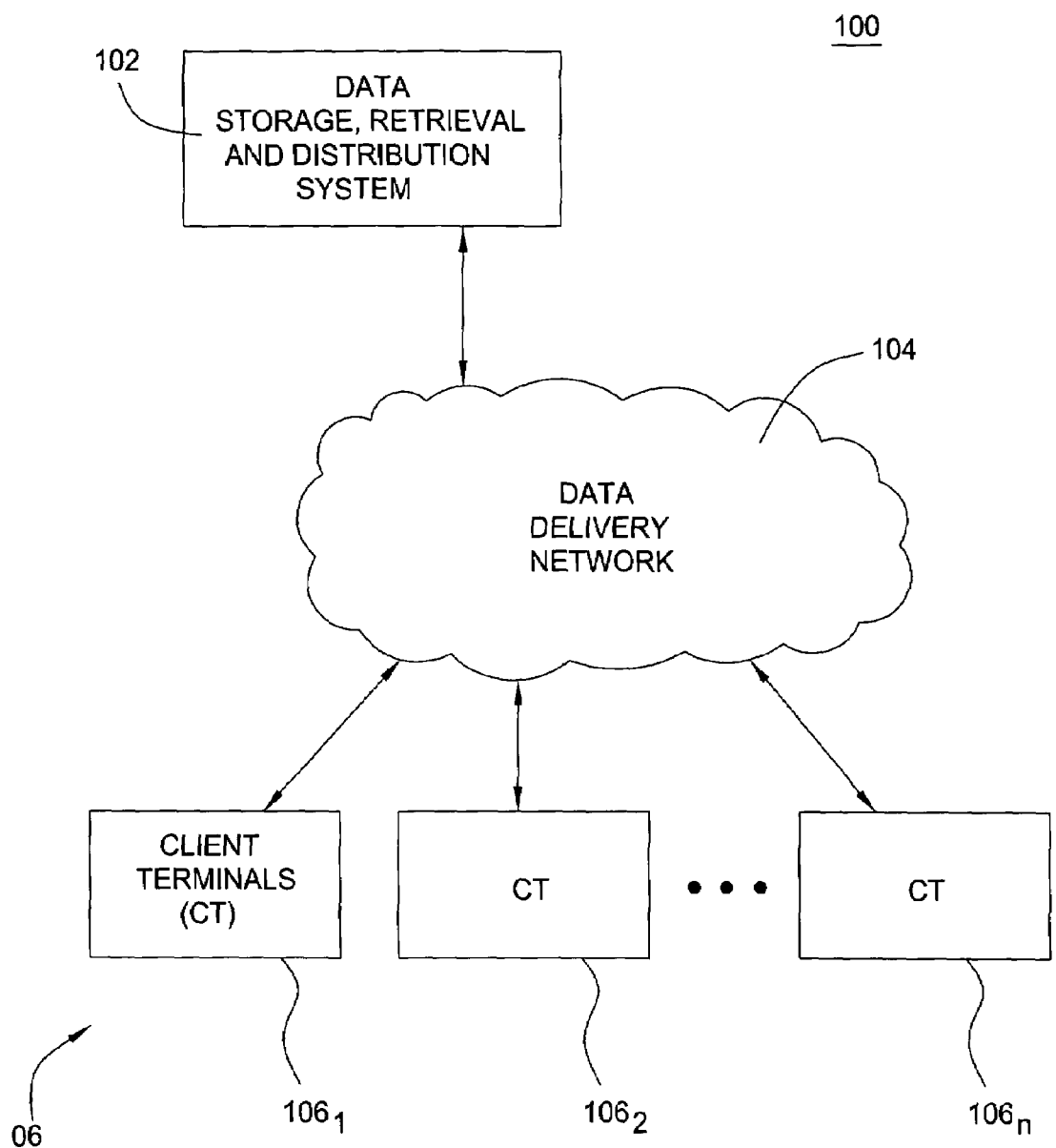
FIG. 1 depicts a high level block diagram of a multiple user, interactive data distribution and delivery system.

FIG. 1 depicts a high level block diagram of a multiple user information distribution and delivery system 100. The overall system comprises a data storage, retrieval and distribution system 102, and a data delivery network 104 and a plurality of client terminals 106. Generally, the client terminals 106 contain network interface circuits that communicates with the system 102 through the communications network 104, e.g., a hybrid fiber-coax (HFC) network, telephone lines, and the like. The data link from the data distribution system to the network interface circuitry is typically a high speed, time-division-multiplexed channel or packet based digital network. The interface circuitry demultiplexes the data from these channels and the client terminals are sent serial data streams that they had previously requested from the data distribution system 102. Additionally, the client terminals 106 control, via command links, the data flow and the type of data that they each receive. The data distribution system 102 processes commands received from a plurality of users, then interprets and implements the commands. The data delivery network 104 could be created and operated by the local telephone system, the is local cable company, or some other service provider organization.

The inventive data distribution system 100 sends data to the data delivery network 104 in a compatible data format to facilitate distribution of data to the proper client terminals. One illustrative example of a use for the inventive data distribution system 100 is within a video-on-demand (VOD) system. Although, in the broadest sense, the inventive data distribution system can distribute any type of digital data, e.g., audio information, video information, textual information, graphics, and the like, to simplify the description of the invention, the following discussion will focus upon using the invention within a VOD system having a large number of users being supplied audio-visual data.

In a VOD system, the users generally have "set top" interface units (client or user terminals) that enable each user to select a video program such as a movie or other multimedia program and control playback of that program using video tape player-like control functions. Specifically, a user can play, pause, stop, fast-forward, fast-fast-forward, reverse, and fast-reverse the program at any time. The data distribution system rapidly processes and implements each user command. Importantly, every user of the system can simultaneously utilize the same control features on any number of programs. Thus, each user views their set top unit as a video tape player capable of accessing a large database of video programming.

The data storage, retrieval and distribution system 102 contains certain apparatus and concomitant methods for interacting with the user and implementing the user commands with unnoticeable delay, i.e., relatively low latency. Typically, once the command has been implemented, the requested data is transmitted onto one of a plurality of user networks by the distribution center in a multiplexed format. Network interface units, within the data delivery system, demultiplex the data streams and extract the data for the appropriate user. The data may be sent in digital format or, in some cases, converted to an analog signal for use by the user.

An example of a data distribution system can be found in U.S. Pat. No. 5,671,377, issued Sep. 23, 1997 and commonly assigned U.S. Pat. No. 6,253,375, issued Jun. 26, 2001, both of which are herein incorporated by reference.

Figure 2:
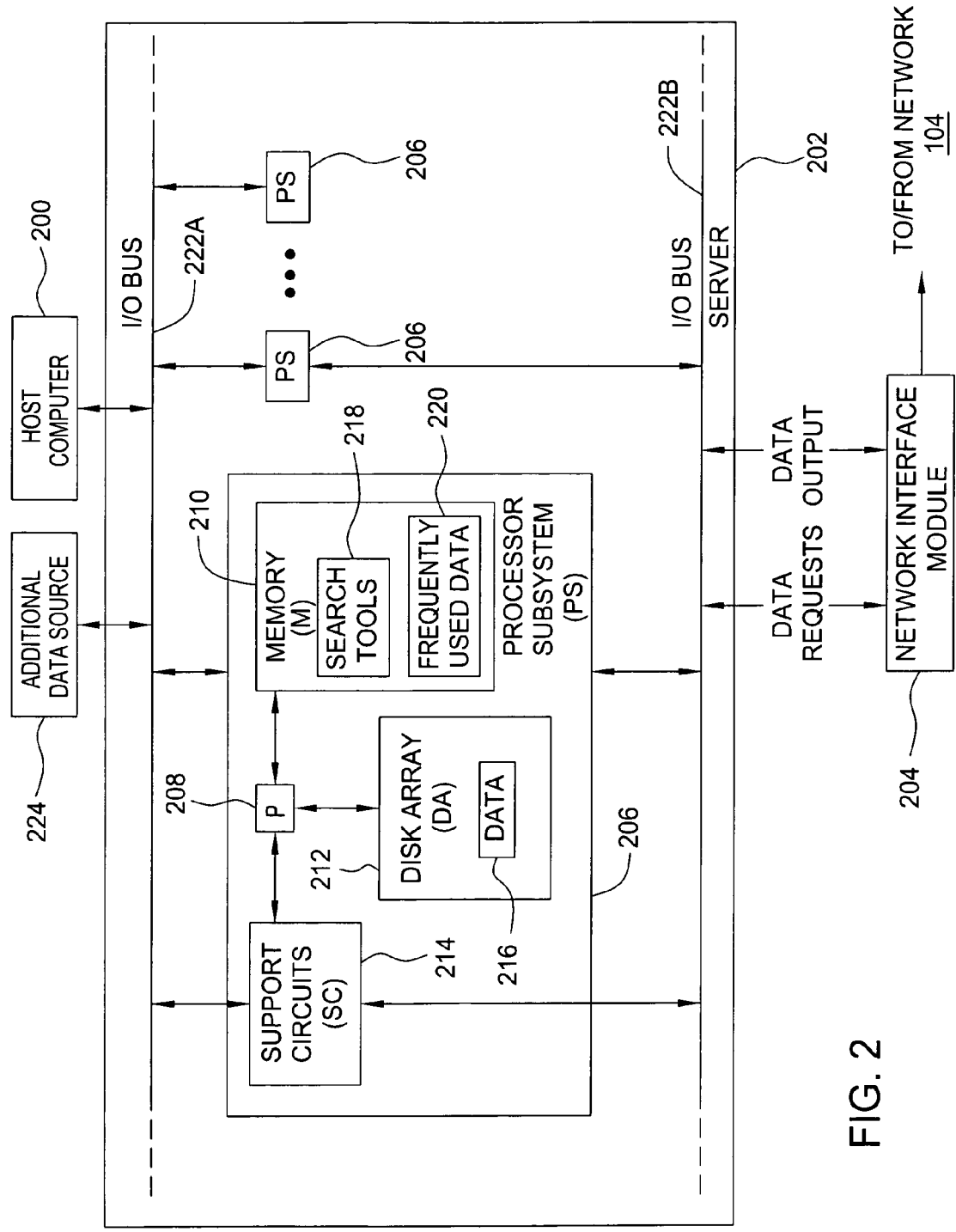
FIG. 2 depicts a block diagram of a data storage, retrieval, and distribution system.

FIG. 2 depicts a high level block diagram of the multiple user data storage, retrieval and distribution system 102 shown in FIG. 1. The system contains a host computer 200, a digital information server 202, a network interface module 204 and an additional data source 224, such as a mass storage device. In general, a plurality of users (not shown) are sent, via the network 104, multiplexed serial information. The users control the operation of the system 102 via a command link. The command link is assumed to be embedded within the full duplex user connection to the network 104. The command link could be a separate communication channel such as Ethernet, telephone line, and the like. The specific implementation of the command link is typically defined by the data delivery system. Each command from the command link is interpreted by the network interface module 204. The network interface module 204 formats the commands (data requests) such that the server can retrieve the requested data. Using the command link, the user has the capability of selecting a video program, e.g., a selected multimedia program, and thereafter starting, stopping, pausing, reversing, and fast forwarding the video program. In other words, the VOD system provides to each user functions that are similar to those available on a conventional video cassette player.

The server 202 comprises a plurality of processor subsystems 206 where each comprise a processor (P) 208, solid state memory 210, a disk array 212, and processor support circuits 214. The processor subsystems 206 are coupled to one another by various input/output buses 222A and 222B. The subsystems 206 are all coupled through a bus 222A to the host computer 200. The support circuits 214 may include well known circuitry such as bus interface circuits, cache, clocks, data registers and the like. The disk array 212 may contain one or more disk drives for storing data 216, e.g., movies or other multimedia assets. In accordance with the present invention the solid state memory 210 stores search tools 218 (e.g., a search engine and/or programming guides) and frequently used data 220 (e.g., video chips).

Since the disk drive arrays 212 have limited storage, an additional data source 224 is provided. The source 224 may be a magneto-optical drive array, a data delivery network, a live feed from one or more television networks, and the like.

In operation, when a user requests information, e.g., a selected multimedia stream, the server 202 retrieves the information from the disk array 212. The user performs information selection through a graphical interface known as a search engine or program guide. The search engine is known as a Navigator that is implemented as a series of "applet" programs and concomitant graphics that are sent from the server 202 to the user terminals. These applets produce a menu structure that enables the user to interact with the system. A detailed disclosure of such a Navigator is disclosed in commonly assigned U.S. Pat. No. 6,208,335, issued Mar. 27, 2001, and incorporated herein by reference.

The server 202 contains two forms of local memory (a disk drive array 212 and dynamic random access memory (DRAM) 210) that respectively store the selectable information and the applets. To facilitate rapid access and distribution of search engine applets, these applets are stored in DRAM 210. These applets are recalled on a regular basis and transmitted to the user terminals to facilitate selection of the information.

An example of a parallel processor based server is disclosed in U.S. Pat. No. 5,671,377, issued Sep. 23, 1997 which is incorporated herein by reference.

Figure 3:
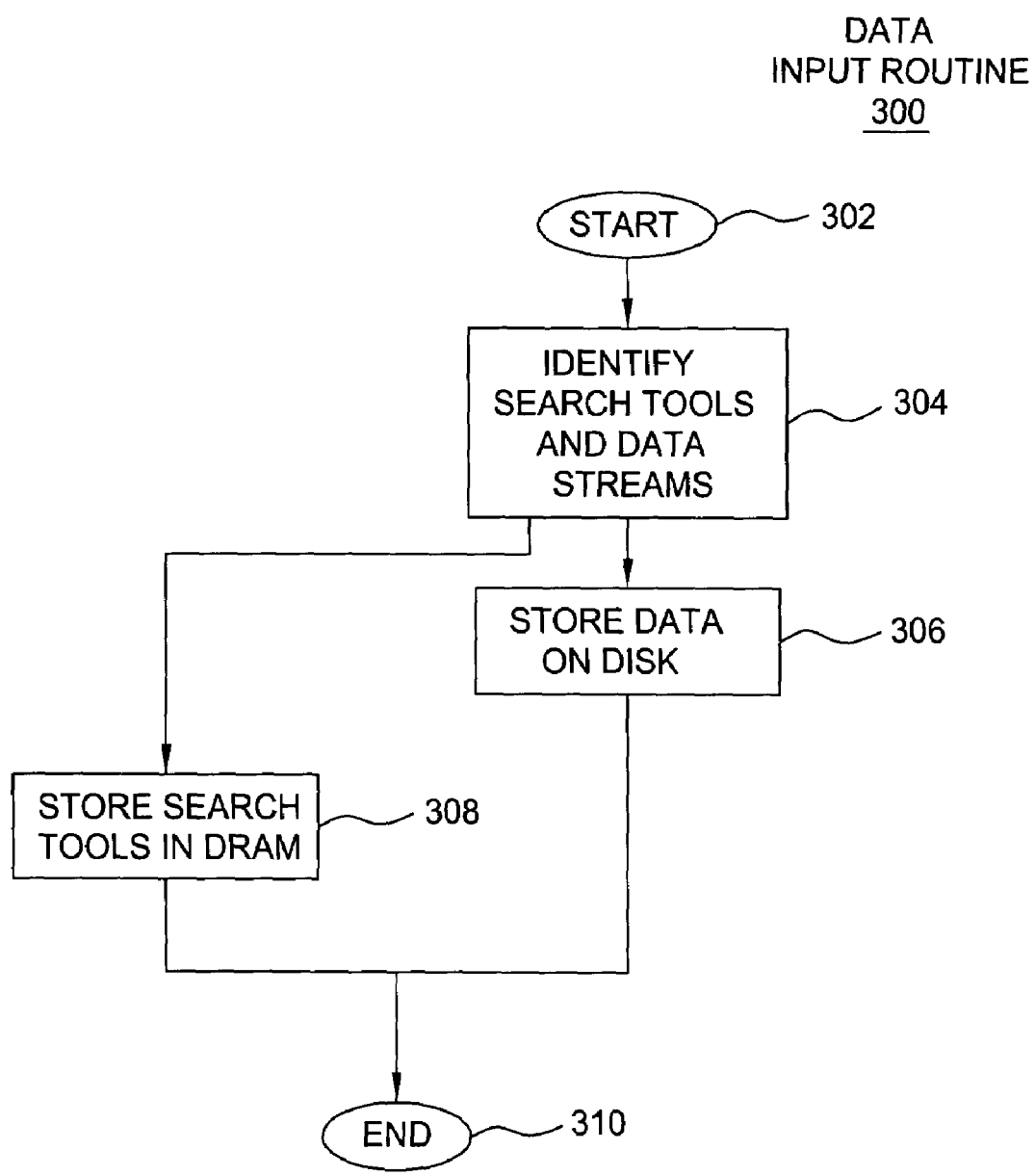
FIG. 3 depicts a flow diagram of a data input routine.

FIG. 3 depicts a flow diagram showing a process 300 used to input data and search tools into the server 202. The process 300 starts at step 302 and proceeds to step 304. At step 304, the server inspects the incoming bitstream to identify search tool components and general data, e.g., movies. The search tool information contains various files, graphics, video and audio that are labeled in the bitstream as belonging to the search tool. The identified data is stored at step 306 in a disk drive or drives. If the data is striped across one or more disk drives, the server facilitates the striping process. The search tool components are stored, at step 308, in DRAM. If data striping is used, as described in U.S. Pat. No. 5,671,377, the search tool components are striped across the processor subsystems and their respective DRAM in the same manner as the data is striped onto the disks. The data input routine 300 stops at step 310.

Figure 4:
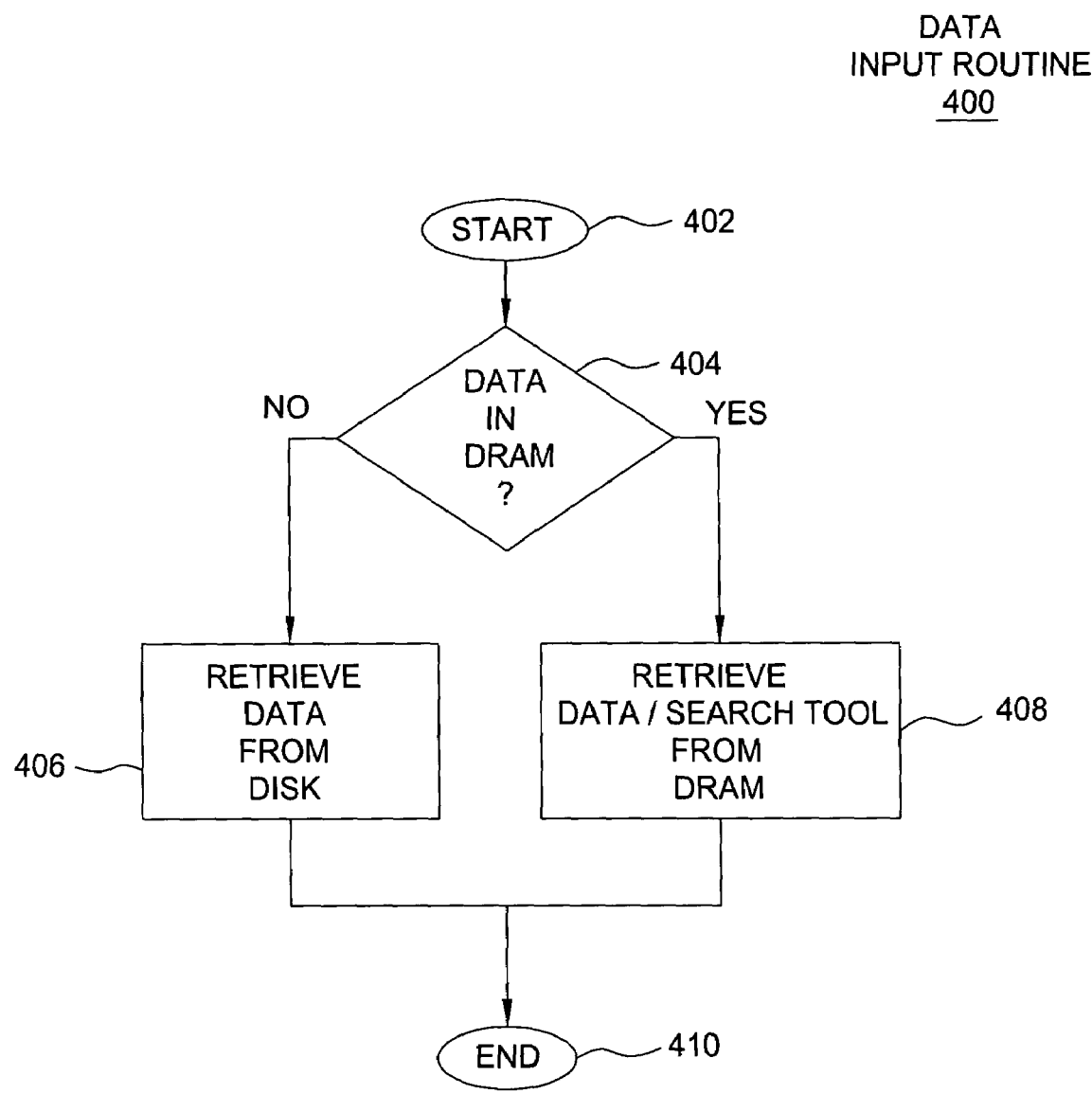
FIG. 4 depicts a flow diagram of a data output routine.

FIG. 4 depicts a flow diagram showing a process 400 used to retrieve data/search tools from the server. The process begins at step 402 and proceeds to step 404. At step 404, the process queries whether the requested information is stored in DRAM. If the query is negatively answered, the process proceeds to step 406 where the data is retrieved from disk. The process 400 then ends at step 410. If the query at step 404 is affirmatively answered, the information is retrieved, at step 408, from DRAM. The process ends at step 410.

The information stored in DRAM is rapidly accessed with very little latency. As such, the information includes material that users frequently request such as search tools and frequently viewed video clips. By storing this frequently used information in DRAM rather than bulk storage (e.g., disk drive storage), the information can be rapidly retrieved for transmission to users.

Figure 5:
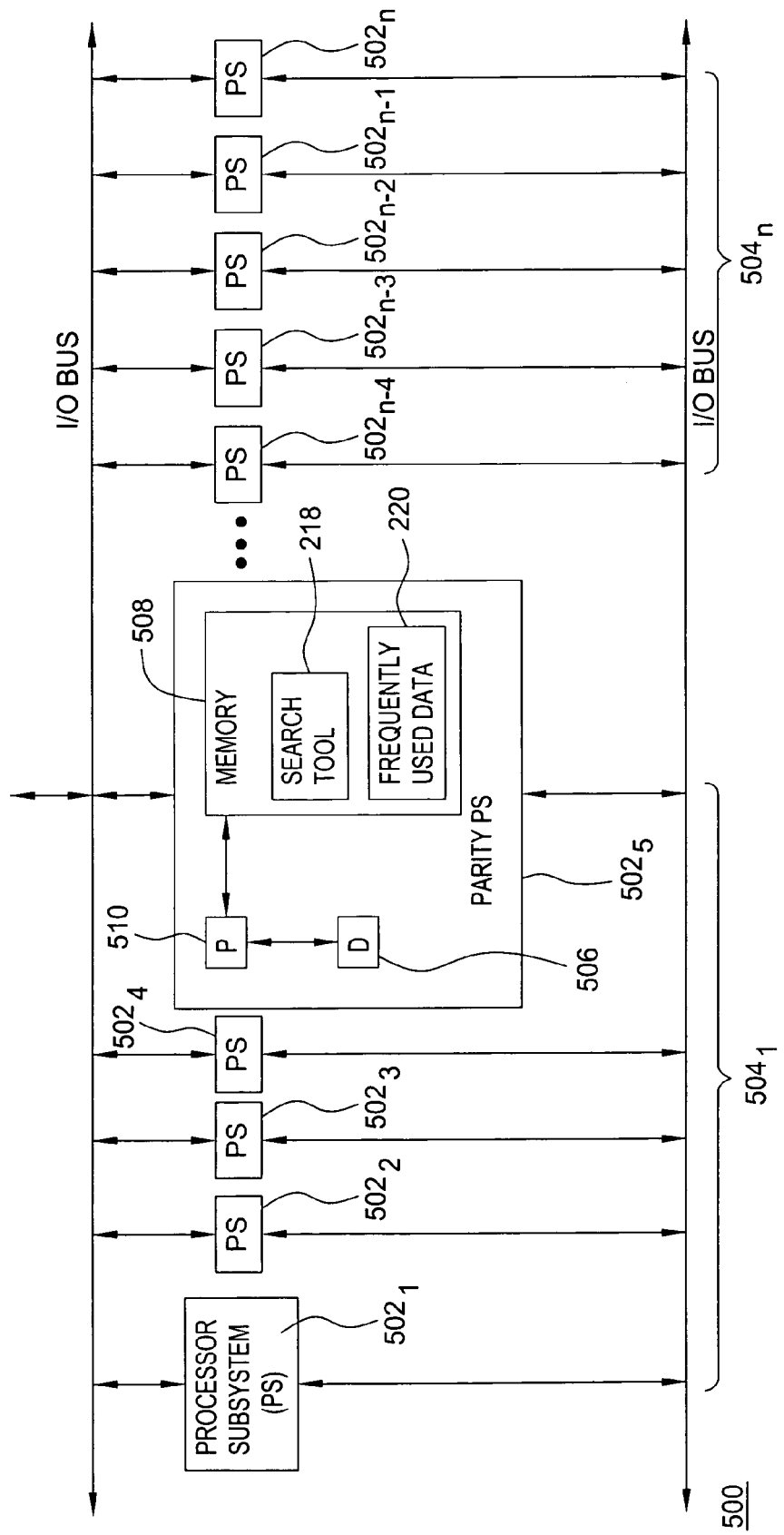
FIG. 5 depicts a block diagram of an alternative embodiment of the invention.

FIG. 5 depicts an alternative embodiment of the invention wherein the frequently used data is stored in a select number of solid state DRAM rather than distributed across all of the DRAMs. Specifically, server 500 comprises a plurality of processor subsystems $502_1$ through $502_n$ that are organized into parity groups $504_1$ through $504_m$. Each parity group contains a plurality of processor subsystems 502, e.g., five. Each processor subsystem 502 comprises a processor 510, a disk-based storage device 506, and solid state DRAM 508.

Using five subsystems in a parity group as an illustrative example, the group $504_1$ comprises four processor subsystems $502_1$ through $502_4$ that handle data as described with respect to FIG. 2 and the processor subsystem $502_5$ handles parity processing. The parity bits of the data stored in the disk storage of subsystems $502_1$ through $502_4$ are stored on the disk storage 506 of subsystem $502_5$. Since the parity processor subsystems are not used as often as the other data subsystems, the frequently used data 220 and/or search tools 218 are stored in DRAM 508 of the parity processor subsystems 502$_5$, 502$_{10}$, etc. As with the previous embodiment, the data is striped across the DRAMs, in this case, striped across the parity DRAMs only. The I/O buses 220A and 220B facilitate data storage and command implementation as described above.

Although various embodiments which incorporate the teachings of the present invention have been shown and described in detail herein, those skilled in the art can readily devise many other varied embodiments that still incorporate these teachings.

What is claimed is:

1. A method, comprising:
   storing an interactive search tool in a dynamic random access memory (DRAM) of a server in subscriber equipment in an interactive information distribution system, wherein said server comprises a plurality of processor subsystems and each of said processor subsystems comprises a DRAM;
   storing a plurality of multimedia content in at least one mass storage device in said subscriber equipment;
   providing said interactive search tool to said subscriber equipment in response to a request for a plurality of services, wherein the request for services includes requesting a multimedia program and control playback of that program;
   providing at least one of said multimedia content to said subscriber equipment in response to a request for at least one multimedia content from said interactive search tool;
   identifying a portion of said multimedia content as frequently accessed multimedia content; and
   storing said frequently accessed multimedia content in DRAM associated with a parity processor subsystem.

2. A method, comprising:
   storing an interactive search tool in a dynamic random access memory (DRAM) of a server in subscriber equipment in an interactive information distribution system, wherein said server comprises a plurality of processor subsystems and each of said processor subsystems comprises a DRAM;
   storing a plurality of multimedia content in at least one mass storage device in said subscriber equipment;
   providing said interactive search tool to said subscriber equipment in response to a request for a plurality of services, wherein the request for services includes requesting a multimedia program and control playback of that program;
   providing at least one of said multimedia content to said subscriber equipment in response to a request for at least one multimedia content from said interactive search tool;
   identifying a portion of said multimedia content as frequently accessed multimedia content; and
   storing said frequently accessed multimedia content in said DRAM associated with the processor subsystem that is less used than other processor subsystems.

3. An apparatus, comprising:
   a server comprising a plurality of processor subsystems, each processor subsystem comprising a dynamic random access memory (DRAM) for storing an interactive search tool and at least one mass storage device for storing a plurality of multimedia content, wherein said interactive search tool is striped across a plurality of said DRAMs in said processor subsystems, wherein a subset of said plurality of processor subsystems are a plurality of parity processor subsystems and said interactive search tool is stored in said parity processor subsystems;
   a subscriber equipment including said server, said subscriber equipment to access said multimedia content in an interactive information distribution system; and
   a service provider equipment coupled to said subscriber equipment via a distribution network, wherein said server provides said interactive search tool to said subscriber equipment in response to said request for services, the request for services includes requesting multimedia program and control playback of that program, and provides at least one of said multimedia content to said subscriber equipment in response to a request for at least one multimedia content from said interactive search tool.

4. The method of claim 1, wherein said mass storage device is a disk drive or disk drive array.

5. The method of claim 1, wherein said providing said interactive search tool step further comprises providing a plurality of applet programs and concomitant graphics to said subscriber equipment.

6. The method of claim 1, wherein said interactive search tool is a program guide.

7. The method of claim 2, wherein said mass storage device is a disk drive or disk drive array.

8. The method of claim 2, wherein said providing said interactive search tool step further comprises providing a plurality of applet programs and concomitant graphics to said subscriber equipment.

9. The method of claim 2, wherein said interactive search tool is a program guide.

10. The apparatus of claim 3, wherein said providing said interactive search tool step further comprises providing a plurality of applet programs and concomitant graphics to said subscriber equipment.

11. The apparatus of claim 10, wherein said interactive search tool is a program guide.

12. The apparatus of claim 3, wherein a number of said DRAM used to store an interactive search tool is less than a total number of DRAM available for such storage.

13. The apparatus of claim 3 further comprising:
    identifying a portion of said multimedia content as frequently accessed multimedia content; and
    storing said frequently accessed multimedia content in said DRAM.

14. The apparatus of claim 12 further comprising:
    identifying a portion of said multimedia content as frequently accessed multimedia content; and
    storing said frequently accessed multimedia content in said DRAM.

* * * * *